US00RE50771E

(19) United States
(12) Reissued Patent
Turtinen et al.

(10) Patent Number: US RE50,771 E
(45) Date of Reissued Patent: Jan. 27, 2026

(54) INDICATING OPTIONAL PARAMETER GROUPS

(71) Applicant: NOKIA TECHNOLOGIES OY, Espoo (FI)

(72) Inventors: Samuli Heikki Turtinen, Ii (FI); Juho Mikko Oskari Pirskanen, Kangasala (FI); Timo Koskela, Oulu (FI)

(73) Assignee: NOKIA TECHNOLOGIES OY, Espoo (FI)

(21) Appl. No.: 17/138,430

(22) Filed: Dec. 30, 2020

Related U.S. Patent Documents

Reissue of:
(64) Patent No.: 10,171,138
Issued: Jan. 1, 2019
Appl. No.: 15/282,324
Filed: Sep. 30, 2016

(51) Int. Cl.

| | |
|---|---|
| ***H04B 7/04*** | (2017.01) |
| ***H04B 7/0417*** | (2017.01) |
| ***H04B 7/06*** | (2006.01) |
| ***H04L 5/00*** | (2006.01) |
| ***H04W 72/04*** | (2023.01) |
| ***H04W 72/23*** | (2023.01) |
| *H04W 48/08* | (2009.01) |

(52) U.S. Cl.
CPC ..... *H04L 5/005* (2013.01); *H04B 7/0417* (2013.01); *H04B 7/0617* (2013.01); *H04W 72/23* (2023.01); *H04W 48/08* (2013.01)

(58) Field of Classification Search
CPC ..... H04W 72/042; H04W 48/08; H04B 7/01417; H04B 7/0617; H04L 5/005
See application file for complete search history.

(56) References Cited

U.S. PATENT DOCUMENTS

| | | | |
|---|---|---|---|
| 6,856,625 | B1 | 2/2005 | Shamsunder et al. |
| 9,125,135 | B2 | 9/2015 | Parkvall et al. |
| 9,832,794 | B2 | 11/2017 | Martin |
| 2006/0040645 | A1 | 2/2006 | Grilli et al. |
| 2006/0195441 | A1 | 8/2006 | Julia et al. |

(Continued)

FOREIGN PATENT DOCUMENTS

| | | | |
|---|---|---|---|
| CN | 102037759 | A | 4/2011 |
| CN | 102056243 | A | 5/2011 |

(Continued)

OTHER PUBLICATIONS

Extended European Search Report for Application No. 16772017.6 dated Nov. 21, 2018.

(Continued)

*Primary Examiner* — Matthew E Heneghan
(74) *Attorney, Agent, or Firm* — ALSTON & BIRD LLP

(57) ABSTRACT

Various communication systems may benefit from improved network communications. For example, messages sent to a user equipment may benefit from having optional configurations of parameters. A method includes determining optional configurations for parameters that override or supplement a default configuration of the parameters. The optional configurations are grouped into optional parameter groups. The method also includes encoding at least one of the optional parameter groups in a message. In addition, the method includes transmitting the message from the network node to a user equipment.

44 Claims, 8 Drawing Sheets

(56) References Cited

U.S. PATENT DOCUMENTS

| | | | | |
|---|---|---|---|---|
| 2006/0208687 | A1 | 9/2006 | Takeoka et al. | |
| 2008/0049681 | A1 | 2/2008 | Koo et al. | |
| 2008/0188220 | A1 | 8/2008 | DiGirolamo et al. | |
| 2010/0118752 | A1 | 5/2010 | Suzuki et al. | |
| 2010/0120426 | A1 | 5/2010 | Singh et al. | |
| 2011/0081915 | A1 | 4/2011 | Maida et al. | |
| 2011/0182234 | A1 | 7/2011 | Kitazoe et al. | |
| 2012/0039284 | A1 | 2/2012 | Barbieri et al. | |
| 2013/0010964 | A1* | 1/2013 | Fong | H04L 5/0094 370/329 |
| 2013/0237238 | A1 | 9/2013 | Kronander et al. | |
| 2013/0336214 | A1 | 12/2013 | Sayana et al. | |
| 2014/0328329 | A1 | 11/2014 | Novlan et al. | |
| 2015/0063252 | A1 | 3/2015 | Zhang et al. | |
| 2015/0222345 | A1 | 8/2015 | Chapman et al. | |
| 2015/0223090 | A1 | 8/2015 | Van Lieshout et al. | |
| 2015/0289141 | A1 | 10/2015 | Ghasemzadeh et al. | |
| 2015/0327154 | A1* | 11/2015 | Xia | H04W 68/00 370/312 |
| 2016/0029362 | A1 | 1/2016 | Kim et al. | |
| 2016/0150435 | A1 | 5/2016 | Baek et al. | |
| 2016/0183121 | A1* | 6/2016 | Kazmi | H04W 28/18 370/230 |
| 2016/0219626 | A1 | 7/2016 | Martin | |
| 2016/0234746 | A1 | 8/2016 | Gopal et al. | |
| 2016/0286423 | A1 | 9/2016 | Zhu et al. | |
| 2016/0337011 | A1 | 11/2016 | Ying et al. | |
| 2017/0041960 | A1 | 2/2017 | Quan et al. | |
| 2017/0127398 | A1* | 5/2017 | Andgart | H04W 72/046 |
| 2017/0215221 | A1* | 7/2017 | Segev | H04W 76/045 |
| 2017/0332359 | A1* | 11/2017 | Tsai | H04B 7/0617 |
| 2017/0367120 | A1* | 12/2017 | Murray | H04W 72/046 |
| 2018/0048742 | A1* | 2/2018 | Venkatesan | H04L 69/24 |
| 2018/0054837 | A1* | 2/2018 | Islam | H04W 74/0833 |
| 2018/0083680 | A1* | 3/2018 | Guo | H04B 7/0617 |
| 2018/0097547 | A1 | 4/2018 | Turtinen et al. | |

FOREIGN PATENT DOCUMENTS

| | | | |
|---|---|---|---|
| CN | 102204356 | A | 9/2011 |
| CN | 102625394 | A | 8/2012 |
| CN | 102804901 | A | 11/2012 |
| CN | 102823186 | A | 12/2012 |
| CN | 103155463 | A | 6/2013 |
| CN | 103155669 | A | 6/2013 |
| CN | 103339979 | A | 10/2013 |
| CN | 104320775 | A | 1/2015 |
| CN | 104508997 | A | 4/2015 |
| CN | 105432121 | A | 3/2016 |
| CN | 105917695 | A | 8/2016 |
| CN | 105960816 | A | 9/2016 |
| CN | 109845124 | A | 6/2019 |
| EP | 2471633 | A2 | 7/2012 |
| WO | WO 2012/127851 | A2 | 9/2012 |
| WO | 2016086144 | A1 | 6/2016 |

OTHER PUBLICATIONS

Extended European Search Report for Application No. 17855067.9 dated Apr. 7, 2020.

International Search Report and Written Opinion issued in International Patent Application No. PCT/FI2017/050617 dated Nov. 29, 2017.

Notice of Allowance for Chinese Application No. 201780060473.2 dated Jan. 14, 2022, 3 pages.

Office Action for Chinese Patent Application No. 201780060473.2 dated Jun. 16, 2021, 17 pages.

Office Action for European Patent Application No. 17855067.9 dated Jun. 17, 2021, 12 pages.

Office Action for Chinese Patent Application No. 201780060473.2 dated Dec. 16, 2020, 18 pages.

"3rd Generation Partnership Project; Technical Specification Group Radio Access Network; NR; Multiplexing and channel coding (Release 15)", 3GPP TS 38.212 v15.12.0, (Sep. 2021), 101 pages.

"3rd Generation Partnership Project; Technical Specification Group Radio Access Network; NR; NR and NG-RAN Overall Description; Stage 2 (Release 15)", 3GPP TS 38.300 v15.10.0, (Jul. 24, 2020), 100 pages.

"3rd Generation Partnership Project; Technical Specification Group Radio Access Network; NR; NR and NG-RAN Overall Description; Stage 2 (Release 15)", 3GPP TS 38.300 v15.13.0, (Jul. 6, 2021), 102 pages.

"3rd Generation Partnership Project; Technical Specification Group Radio Access Network; NR; NR and NG-RAN Overall Description; Stage 2 (Release 16)", 3GPP TS 38.300 v16.2.0, (Jul. 24, 2020), 148 pages.

"3rd Generation Partnership Project; Technical Specification Group Radio Access Network; NR; Physical channels and modulation (Release 15)", 3GPP TS 38.211 v15.10.0, (Dec. 2021), 96 pages.

"3rd Generation Partnership Project; Technical Specification Group Radio Access Network; NR; Physical layer procedures for data (Release 15)", 3GPP TS 38.214 v16.2.0, (Dec. 2021), 106 pages.

"3rd Generation Partnership Project; Technical Specification Group Radio Access Network; NR; Physical layer procedures for data (Release 16)", 3GPP TS 38.214 v15.15.0, (Jun. 2020), 163 pages.

"3rd Generation Partnership Project; Technical Specification Group Radio Access Network; NR; Radio Resource Control (RRC) protocol specification (Release 15)", 3GPP TS 38.331 v15.10.0, (Jul. 24, 2020), 539 pages.

"3rd Generation Partnership Project; Technical Specification Group Radio Access Network; NR; Radio Resource Control (RRC) protocol specification (Release 15)", 3GPP TS 38.331 v15.16.0, (Dec. 2021), 542 pages.

"3rd Generation Partnership Project; Technical Specification Group Radio Access Network; NR; Radio Resource Control (RRC) protocol specification (Release 16)", 3GPP TS 38.331 v16.2.0, (Sep. 2020), 926 pages.

Holma et al., "5G Technology, 3GPP New Radio", John Wiley & Sons Ltd., (2020), 516 pages.

Ericsson, "Text proposal including agreements on Physical layer parameters in the TS 36.331", 3GPP TSG-RAN WG2 #62, R2-082167, (May 5-9, 2008), 5 pages.

Notice of Allowance for Chinese Application No. 202210313958.0 dated Jan. 22, 2025, 8 pages.

Office Action for Chinese Application No. 202210313958.0 dated Nov. 7, 2024, 6 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 v11.0.0, (Jun. 2012), 302 pages.

Office Action for European Application No. 17855067.9 dated Jun. 7, 2023, 10 pages.

Office Action for Chinese Application No. 202210313958.0 dated Feb. 4, 2024, 13 pages.

Jiang Cunbo et al., "Online System Upgrading Method for WSN Node Firmware Based on STM32 Processor", Computer Applications and Software, vol. 33, No. 5, (May 2016), 4 pages.

Han Longlong Rao et al., "An implementation scheme of WCDMA user shielding and gating system based on location update mechanism", Communications Technology, vol. 48, No. 5, (May 2015), 5 pages.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 v13.2.0, (Jun. 2016), 623 pages.

Samsung (Email Rapporteur), "Report of Email Discussion on [94#40][NR] System Information", 3GPP TSG-RAN WG2 95, R2-165201, (Aug. 22-26, 2016), 31 pages.

Nov. 29, 2017 International Search Report and Written Opinion issued in International Patent Application No. PCT/FI2017/050617.

3GPP TS 36.331 V14.0.0 (Sep. 2016). 3rd Generation Partnership Project; Technical Specification Group Radio Access Network; Evolved Universal Terrestrial Radio Access (E-UTRA); Radio Resource Control (RRC); Protocol specification (Release 14) [online], Sep. 28, 2016 [retrieved on Nov. 24, 2017]. Retrieved from <http://

(56) References Cited

OTHER PUBLICATIONS www.3gpp.org/ftp/tsg_ran/WG2_RL2/Specifications/201609_drafts_specs_after_RAN_73/draft_36331-e00.zip>The Whole document, in particular Sections 5.2.1.1, 6.1.

* cited by examiner

*XSystemInformationBlock*

```
-- ASN1START

XSystemInformationBlock ::=     SEQUENCE {
  plmn-Identity                 PLMN-Identity,
  cellIdentity                  CellIdentity,
  cellBarred                    ENUMERATED {barred, notBarred},
  cellReservedForOperatorUse      ENUMERATED {reserved, notReserved},
  defaultConfigID                 INTEGER(0..15),
  prach-uRoot                   INTEGER (1..70),

  parameterOne                    parameterOne,     OPTIONAL
  parameterTwo                    parameterTwo,     OPTIONAL

  ...
}

-- ASN1STOP
```

Figure 6

*ParameterGroup1 information element*

```
-- ASN1START

ParameterGroup1 ::=    SEQUENCE {
   parameter1                    Parameter1,
   parameter2                    Parameter2,
   parameter3                    Parameter3,
   parameter4                    Parameter4,

}

-- ASN1STOP
```

Figure 7a

*ParameterGroup2 information element*

```
-- ASN1START

ParameterGroup2 ::=    SEQUENCE {
   OverrideDefaultConfig            BOOLEAN,
   Parameter21                   Parameter21,
   Parameter22                   Parameter22,
   Parameter23                   Parameter23,
   Parameter24                   Parameter24,

}

-- ASN1STOP
```

Figure 7b

INDICATING OPTIONAL PARAMETER GROUPS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a reissue of U.S. Patent No. 10,171,138, titled "Indicating Optional Parameter Groups," issued Jan. 1, 2019, which is hereby incorporated by reference herein in its entirety.*

BACKGROUND

Field

Various communication systems may benefit from improved network communications. For example, messages sent to a user equipment from the network may benefit from having optional configurations of parameters.

Description of the Related Art

Control plane system information provisioning has traditionally included a Master Information Block (MIB) and a number of System Information Blocks (SIB) which are broadcast over a given area of a cell. MIB and SIB may be used in third generation partnership project (3GPP) Universal Mobile Telecommunications System (UMTS) technology, such as Long Term Evolution (LTE). In LTE, MIB is carried over a broadcast transport channel (BCH) and mapped to a physical broadcast channel (PBCH). SIB, on the other hand, is carried over a downlink shared transport channel (DL-SCH) and mapped to a broadcast control channel logical channel (BCCH).

LTE MIB may be used by the system to carry to a user equipment important physical layer information of a cell. A first SIB (SIB1) and a second SIB (SIB2), for example, may be used by the user equipment before attempting to access the cell. SIB1 may contain information relevant to evaluating if a user equipment is allowed to access a cell, while also defining a schedule of other system information blocks. SIB2 may contain common and shared channel information. Other SIBs can contain information about intra or serving frequency, inter-frequency, inter-radio access technology (RAT) cells relevant for cell re-selection, Earthquake and Tsunami Warning System (ETWS), Commercial Mobile Alerts System (CMAS) notification, extended access barring (EAB), multimedia broadcast or multicast service (MBMS), and/or Promoting Standardization for Embedded Systems (ProSe).

Different transceiver architectures may be considered for radio access in $5^{th}$ generation (5G) technology. To compensate for increased path loss when operating on higher frequencies, beamforming may be used to provide cell coverage. For example, beam sweeping may be used to cover a cell area having common control information. Due to the increased number of beams within a given cell coverage area, it may be difficult to transmit a large amount of common control information to the entire coverage area.

SUMMARY

A method, in certain embodiments, may include determining optional configurations for parameters that override or supplement a default configuration of the parameters. The optional configurations are grouped into optional parameter groups. The method may also include encoding at least one of the optional parameter groups in a message. In addition, the method may include transmitting the message from the network node to a user equipment.

According to certain embodiments, an apparatus may include at least one memory including computer program code, and at least one processor. The at least one memory and the computer program code may be configured, with the at least one processor, at least to determine optional configurations for parameters that override or supplement a default configuration of the parameters. The optional configurations are grouped into optional parameter groups. The at least one memory and the computer program code may also be configured, with the at least one processor, to cause the apparatus at least to encode at least one of the optional configurations in a message. In addition, the at least one memory and the computer program code may be configured, with the at least one processor, at least to transmit the message from the network node to a user equipment.

An apparatus, in certain embodiments, may include means for determining optional configurations for parameters that override or supplement a default configuration of the parameters. The optional configurations are grouped into optional parameter groups. The apparatus also includes means for encoding at least one of the optional parameter groups in a message. In addition, the apparatus may include means for transmitting the message from the network node to a user equipment.

According to certain embodiments, a non-transitory computer-readable medium encoding instructions that, when executed in hardware, perform a process. The process may include determining optional configurations for parameters that override or supplement a default configuration of the parameters. The optional configurations are grouped into optional parameter groups. The process may also include encoding at least one of the optional parameter groups in a message. In addition, the process may include transmitting the message from the network node to a user equipment.

According to certain embodiments, a computer program product encoding instructions for performing a process according to a method including determining optional configurations for parameters that override or supplement a default configuration of the parameters. The optional configurations are grouped into optional parameter groups. The method may also include encoding at least one of the optional parameter groups in a message. In addition, the method may include transmitting the message from the network node to a user equipment.

A method, in certain embodiments, may include receiving message at a user equipment from a network node. The message comprises optional parameter groups comprising optional configurations for parameters that override or supplement a default configuration of the parameters. The method may also include configuring radio parameters according to the message. In addition, the method may include overriding or supplementing the default configuration with the optional configurations.

According to certain embodiments, an apparatus may include at least one memory including computer program code, and at least one processor. The at least one memory and the computer program code may be configured, with the at least one processor, to cause the apparatus at least to receive message at a user equipment from a network node. The message comprises optional parameter groups comprising optional configurations for parameters that override or supplement a default configuration of the parameters. The at least one memory and the computer program code may also be configured, with the at least one processor, to cause the apparatus at least to configure radio parameters according to the message. In addition, the at least one memory and the computer program code may be configured, with the at least one processor, to cause the apparatus at least to override or supplement the default configuration with the optional configurations.

An apparatus, in certain embodiments, may include means for receiving message at a user equipment from a network node. The message comprises optional parameter groups comprising optional configurations for parameters that override or supplement a default configuration of the parameters. The apparatus may also include means for configuring radio parameters according to the message. In addition, the apparatus may include means for overriding or supplementing the default configuration with the optional configurations.

According to certain embodiments, a non-transitory computer-readable medium encoding instructions that, when executed in hardware, perform a process. The process may include receiving message at a user equipment from a network node. The message comprises optional parameter groups comprising optional configurations for parameters that override or supplement a default configuration of the parameter. The process may also include configuring radio parameters according to the message. In addition, the process may include overriding or supplementing the default configuration with the optional configurations.

According to certain embodiments, a computer program product encoding instructions for performing a process according to a method including receiving message at a user equipment from a network node. The message comprises optional parameter groups comprising optional configurations for parameters that override or supplement a default configuration of the parameters. The method may also include configuring radio parameters according to the message. In addition, the method may include overriding or supplementing the default configuration with the optional configurations.

BRIEF DESCRIPTION OF THE DRAWINGS

For proper understanding of the invention, reference should be made to the accompanying drawings, wherein:

FIG. 6 illustrates system information according to certain embodiments.

FIG. 7a illustrates parameters according to certain embodiments.

FIG. 7b illustrates parameters according to certain embodiments.

DETAILED DESCRIPTION

Certain embodiments may allow for flexibility in delivering system information to a user equipment. For example, an identification of a default configuration of a system parameter or a control parameter may be provided along with optional configurations or parameters of an optional parameter group that override the default configuration parameter. The optional configurations may be set within a limit given by the maximum container size of a broadcast channel, ensuring that the optional configurations are effectively transmitted to the user equipment while limiting the overhead caused by the optional configurations. The optional parameter group may only use one optionality bit in an the Abstract Syntax Notation One (ASN.1) encoding, rather than multiple bits if the parameters were to be separately signaled.

Different transceiver architectures, such as digital, analogue, and/or hybrid, may be considered for 5G radio access systems. A hybrid architecture can utilize digital baseband processing, such as Multiple Input Multiple Output (MIMO) and/or data precoding. Although certain embodiments may be discussed in the context of analogue beamforming, such as full analogue transceiver or a hybrid transceiver, the embodiments discussed below may also be applicable for digital beamforming.

Beamforming may help to provide cell coverage in a given area in order to compensate for increased path loss when operating on higher frequencies. Different transceiver architectures can allow for implementing beamforming in future systems, depending on the cost and/or the complexity needed to adequately transmit and receive the beam. Certain embodiments deployed in lower frequencies, having a frequency of less than or equal to 6 gigahertz (GHz), for example, may be implemented by using fully digital architectures. In higher frequencies, on the other hand, the number of antenna elements used for cell coverage may be greater, ranging from tens to hundreds. Higher frequency transmissions may utilize a hybrid architecture and/or an analogue architecture.

Certain embodiments of beamforming may include sweeping subframes that allow for the signaling of common control channel via beamforming Sweeping subframes may comprise sweeping blocks (SB), which each cover a specific area of the cell having a set of active beams. In some embodiments, the total number of beams needed for covering a given cell area may be larger than the number of concurrent active beams that the access point can form. Therefore, access points may need to sweep through the cell coverage area in a time domain by activating different sets of beams in each SB.

Figure 1:
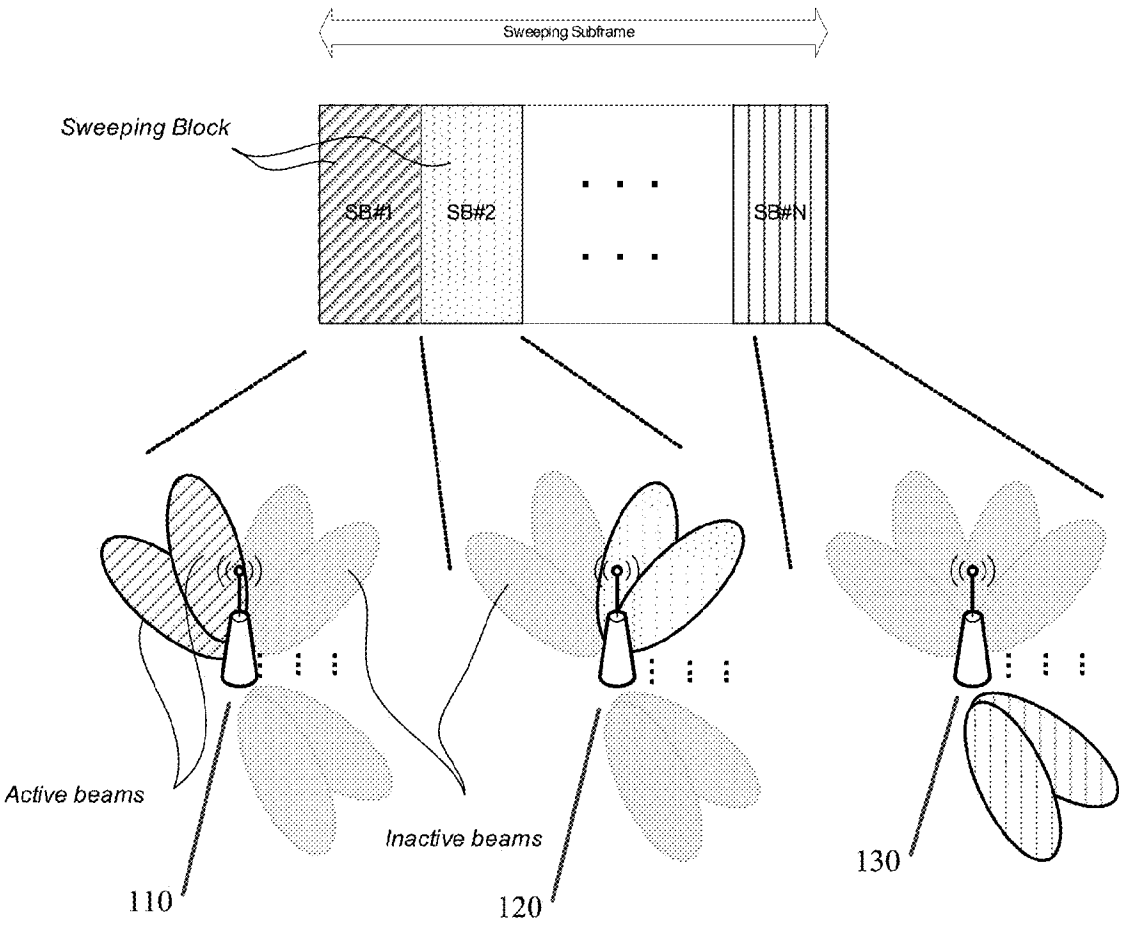
FIG. 1 illustrates a beamforming system.

FIG. 1 illustrates a beamforming system according to certain embodiments. Specifically, FIG. 1 illustrates three access nodes 110, 120, and 130 that employ sweeping subframes. As such, each access node 110, 120, and 130 activates at least one beam in accordance with a SB in a subframe. As time progresses, each access node may activate the at least one beam, in order to cover a given coverage area.

As an example of downlink direction signaling, when downlink common control channel coverage is provided by the sweeping subframe, each SB may carry essential cell system information or access information. The information may include a downlink synchronization signal, system information, such as MIB or SIB, physical random access channel (PRACH) or random access channel (RACH) configurations, and/or paging. The downlink common control channel may also include any other control information that may be broadcasted in a cell. As an example of uplink direction signaling, the sweeping subframe or subframes may accommodate for resources of RAN or other uplink channels that are periodically available, such as a scheduling request (SR) or a sounding reference signal (SRS).

In certain embodiments in which cell coverage may be provided by multiple beams, it may be helpful to identify a single beam, for example, by using a beam specific reference signal that allows a user equipment to perform measurements using beam specific reference signal (BRS) measurements. BSR measurements, for example, may be reference signal received power (RSRP), reference signal received quality (RSRQ), received signal strength indicator (RSSI), and/or channel quality indicator (CQI). The user equipment may indicate to the network a preferred communication beam during initial access and/or map a BSR measurement to a common reference index when reporting the measurement to the network. The mapping of the BSR may be used to identify a beam. Identifying a single beam amongst multiple beams may provide several benefits, including improving the functioning of the communication system.

For example, when eight different BRSs are transmitted for every sweep block, a receiver may be able to measure eight different signals or beams. The same BRSs may then be reused in the next sweep block, and therefore the sweep block identification may be used to determine the beam index. The beam index may be calculated by multiplying the BRS index by the sweep block index. The sweep block index may be explicitly signaled in the sweep block, which can include a sweep symbol or multiple sweep symbols. The index can convey information such as MIB, SIB, downlink control, and/or downlink data. The sweep block may also include a specific sequence to identify the sweep block, for example, a synchronization sequence such as Primary Synchronization Signal (PSS) or Secondary Synchronization Signal (SSS) in LTE.

The user equipment may perform BRS measurements on a downlink sweep in a 5G NodeB (5G-NB) communication beam, and report the measurement results to the 5G-NB. The network may, alternatively or in addition to, send reference signals to the user equipment in order to provide the UE with feedback. These reference signals may be labeled as beam refinement reference signals (BRRS). Depending on the measured signals, different feedback may be used for BRS measurements and/or BRRS measurements. For example, BRS measurements may be performed on the beam reference signals which can be directly associated to a specific beam index. The BRRS, on the other hand, may be performed on specific beam reference signals, even when the beams used to send the signals are not known on the UE side. 5G-NB may then be able to map the measurement results for each reference signal to a beam index.

In certain embodiments, the UE may feedback the measurement results by using physical layer signaling, for example, physical uplink control channel (PUCCH) or a higher layer signaling such as media access control or layer 2 (L2) or radio resource control or layer 3 (L3) by transmitting a beam state information (BSI) report, also known as a beam report. A BSI report may include information such as a beam index or a beam RSRP or RSRQ for all detected beams in a set or group of beams. The set of beams may be determined based on an N number of beams having the highest quality based on, for example, beam Reference Signal Received Power (RSRP) or Reference Signal Received Quality (RSRQ).

The BMI report format may be limited by the signaling used, such as PUCCH, having a fixed number of bits, or MAC Control Element (CE), having its flexibility determined by the grant size. Depending on the measurement type, for example, whether the measurement was made on BRS or BRRS, the report format may be different. When measuring BRSs, the UE may detect explicitly the beam index related to the measurement, while in the case of BRRS measurements the UE may use logical index of detected beam specific reference signals. Reported BRRS measurements may be referred to as beam refinement information (BRI). The beam index space of BSI and BRI may differ in size, in some embodiments, while having a similar size in other embodiments.

In some embodiments, a UE may experience inter-cell mobility. In this embodiment, in which a UE experience inter-cell mobility, the UE may report the identification of the cell in which it resides to provide context to the beam level measurements.

In embodiments involving higher frequencies both the 5G-NB and the UE may utilize be beamforming. The UE may steer or form its receiving beam to multiple directions to determine the desired or highest quality communication beam, or the direction from which the beam will be received. The UE may also measure several receiver directions and determine which direction provides the highest quality based on predefined metrics. The metrics, for example, may be a receiver direction, which detected the highest RSRP of 5G-NB beam, or which receiver direction may detect the highest number of beams above a specific quality threshold, such as a RSRQ threshold.

Because the 5G-NB beam radiation patterns typically overlap, the UE may be able to detect multiple beams per receiver direction. The overlap may be a design choice used to provide coverage in embodiments involving a reflecting radio environment, or the overlap may be used to deter a side lobe of another beam. The UE may then associate the detected 5G-NB beams with the direction in which the beam was received, and group the 5G-NB beams to at least one group based on the direction. For example, the UE may maintain a group of "one" so that a single 5G-NB beam may be associated to a single UE receiver beam. The "one" beam may be the beam which is deemed to have the highest quality (RSRP) as measured by the UE.

Figure 2:
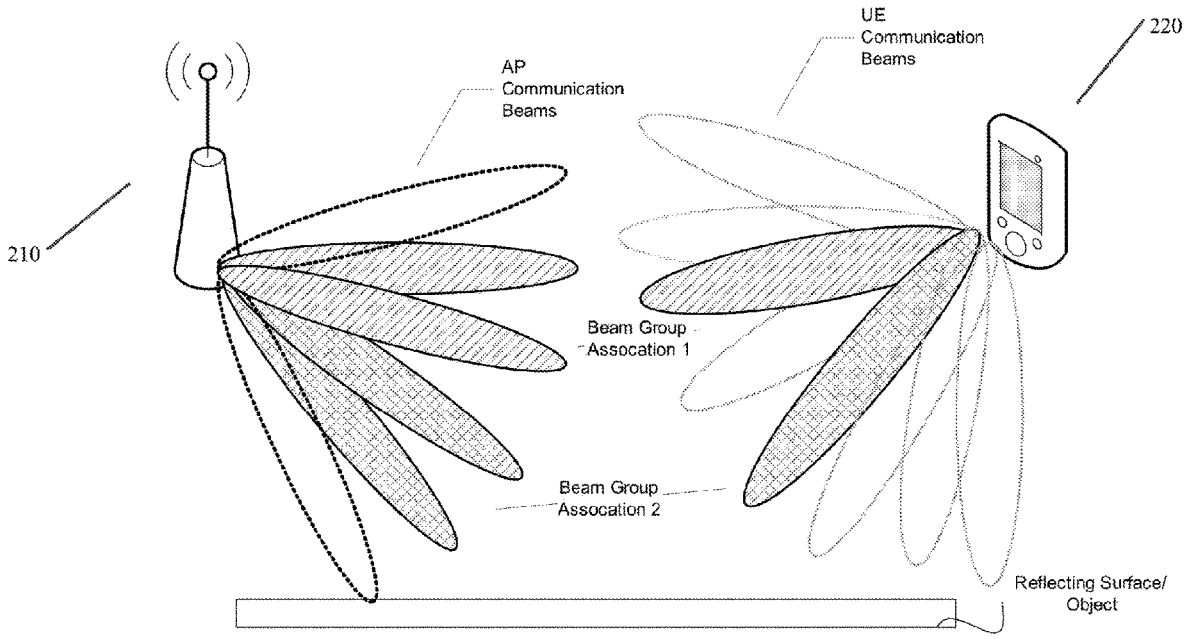
FIG. 2 illustrates a beamforming system.

FIG. 2 illustrates a beamforming system according to certain embodiments. In particular, FIG. 2 illustrates beam grouping on a high level. Based on BRS measurements by different sets of received beams, UE 220 may determine an association between a set of signals or beams received from an access point or network node 210, such as 5G-NB, and the direction from which the signals or beams were received. If the UE is able to form multiple beams concurrently, it may group the detected 5G-NB beams as one group according to the direction of the received signal.

FIG. 2 further illustrates a grouping using grid-of-beams, in which the UE 220 may form alternative beam radiation patterns, such as wider or narrower patterns. The UE, therefore, may be able to detect different amounts of 5G-NB beams, with potentially reduced beamforming gain. In certain embodiments, a single access point, network node, or transmission reception point (TRP) 210 may communicate with UE 220. In other embodiments, the system in FIG. 2 may have multiple TRPs whose signals are collocated.

Figure 3:
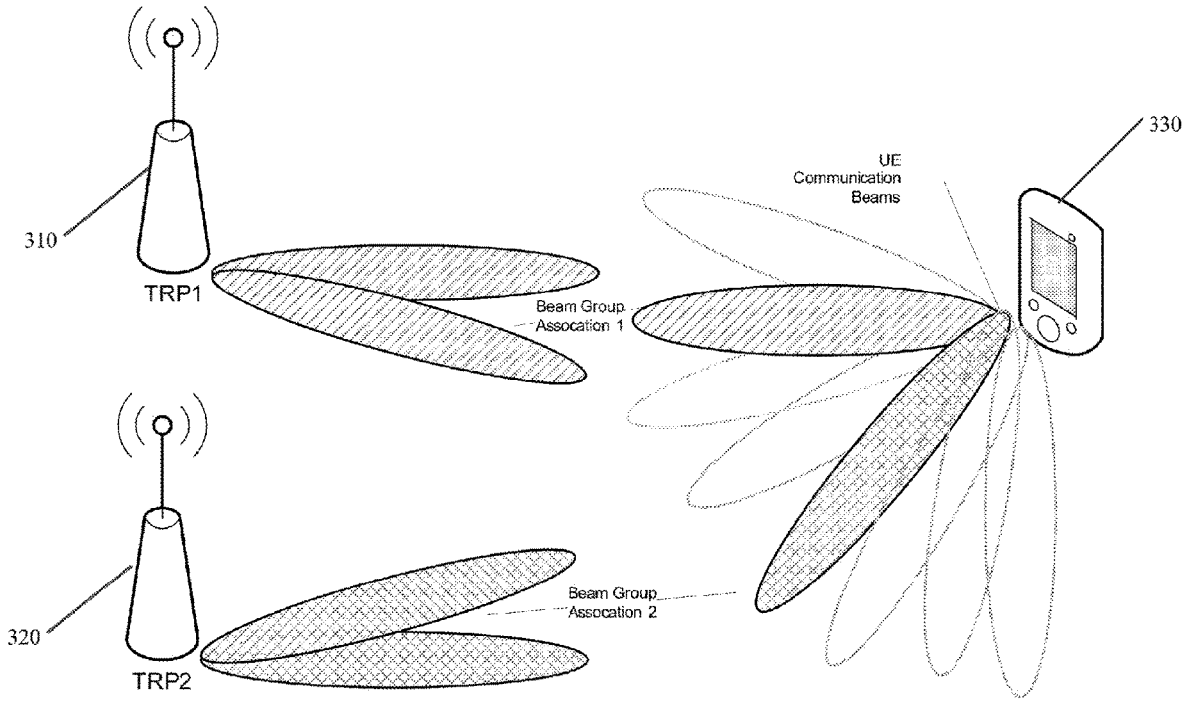
FIG. 3 illustrates a beamforming system.

FIG. 3 illustrates a beamforming system according to certain embodiments. Unlike FIG. 2, FIG. 3 illustrates an embodiment having multiple non-collocated TRPs 310 and 320 communicating with a single UE 330. Signals from each TRP may be group together to form a beam group. In some embodiments, the UE may group or categorize the received beams according to the TRP from which it was received.

Beamforming, in certain embodiments, may be used to compensate for increased path loss caused by having a communication system operate in higher frequencies. In addition, due to the hybrid transceiver architecture, beam sweeping may be used to cover a given cell area with common control information. For example, beam sweeping may be used to transmit synchronization signals, beam or cell reference signals, and/or essential system information. In an embodiment in which hundreds of beams are present within one cell coverage area, it may be a challenge to transmit a large amount of common control information from a network node to the UEs in the cell.

In certain embodiments operating in a 5G environment, a 5G PBCH (xPBCH) may carry physical layer information of the cell to the UE, similar to MIB. The physical layer information may be used by the UE to receive further system information. An evolved PBCH (ePBCH) may carry to the UE information about cell access parameters, similar to an SIB. The access parameters may include public land mobile network (PLMN) identification, cell identification, cell barring information, and/or information about the cell being reserved for operator use. The SIB may also carry at least one default configuration identification that may specify common information of the system. A default configuration identification may be specified, in certain embodiments, during an interoperability development testing (IODT) phase. Any remaining system information can then be provided to the user equipment via a radio resource control (RRC) signaling, after the RRC connection has been established.

In some embodiments the ePBCH may have a fixed container size, for example 100 or 200 bits, as the UE may need to be able to decode it without much information. Introducing more system information content into ePBCH, therefore, may exceed this fixed container size of the ePBCH. In certain embodiments, xPBCH may be decoded first, providing some information about the ePBCH. The provided information may be, in certain embodiment, the length of the used ePBCH in the cell or system, for example, one or two symbols long, which allows for variation of the container size. Even with this variation, however, the ePBCH may not be able to accommodate increased information.

The default configurations, which may be provided by ePBCH, may not provide flexibility for changing the various configuration parameters for special use cases. On the other hand, a fully flexible parameter configuration for SIB may require redundant overhead bits. Because the parameters are optional, at least one of the optional parameter groups may be encoded to an optionality bit in the ASN.1 coding. In other words, at least one optionality bit is added to at least one of the optional parameter groups in the ASN.1 coding. Therefore, certain embodiments described in FIGS. 4, 5, 6, 7a, and 7b may provide for a flexible use of default configurations, as well as partly dedicated parameters of an optional parameter group which may override the default configuration parameters within the limits given by the maximum container size of the broadcast channel.

Figure 4:
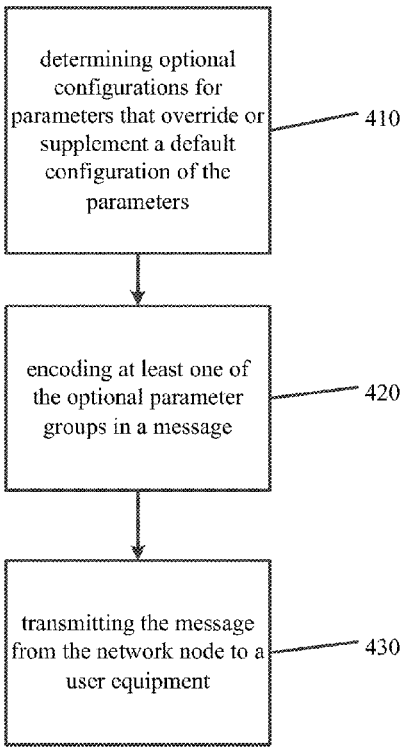
FIG. 4 illustrates a flow diagram according to certain embodiments.

FIG. 4 illustrates a flow diagram according to certain embodiments. Specifically, FIG. 4 illustrates an embodiment of the network node. In step 410, a network node may determine optional configurations for parameters that override or supplement a default configuration of the parameters. In one embodiment, and parameters may be system information parameters. A network node may be an access node, a base station, a 5G-NB, an eNB, server, host, or any of the other access or network node discussed herein. The optional configurations may be grouped into optional parameter groups. In step 420, the network node encodes at least one of the optional parameter groups in a message. The network node may then transmit the message from the network node to a user equipment, as shown in step 430, for example, via a physical broadcast channel. The physical broadcast channel may be a 5G ePBCH having a fixed container size. In addition, the transmission may be part of a beamforming signal sent from the network node to a UE via beam sweeping.

In certain embodiments, the optional parameters may be classified in groups, with one or more optional parameters being placed in a given group. In some embodiments only some of the optional parameters may be classified or included in an optional parameter group. In addition, the optional parameter groups may also be optionally present in the system information, and each optional parameter group included in the system information may use one optionality bit. In addition, the parameters within the group may also be either optionally or mandatorily present. The network node may determine a number of optional parameters in a group, and the number of groups to be encoded. The number of optional configurations or the number of optional parameter groups may be determined such that the container size provided by the lower layers, such as a physical layer, is not exceeded. The network node may then select a subset of the optional parameter groups to be encoded. In some embodiments, a first optional parameter group selected may prevent a second optional parameter group from being selected. For example, the first optional parameter group contains information that conflict with information in the second optional parameter group. The UE receiving the information may determine based on the optional parameter group signaled which parameters inside the group are decoded as optional parameters and which are mandatory parameters.

In other embodiments, the network node may select and/or prioritize the optional parameter group based on a service supported by a cell, a beam, a TRP, a network node, a tracking area, a RAN notification area, and/or a PLMN. The network node may also select and/or prioritize the optional parameter group based on the current service or network situation. For example, the service or network situation may be a RAN sharing with multiple mobile network operators (MNOs), access control, Ultra-reliable and low-latency communications (URLLC) service, massive machine-type communications (mMTC), or a current load situation.

The parameter of an optional parameter group may, in certain embodiments, override the default configuration. The message or signal transmitted from the network node to the UE may include an indication that the optional parameters are meant to override the default configuration. In some other embodiments, the optional parameter may be used to supplemental the default configuration. The message or signal transmitted from the network node to the UE may include an indication that the optional parameters of an optional parameter group are to supplement the default configuration, rather than override the default configuration.

The network node may send a default configuration identification and/or at least one of the optional parameter groups in a message to the UE. In some embodiments, the network node may send the default configuration identification and the at least one optional parameter group in a broadcast message or a dedicated signaling message to a user equipment.

In addition, to sending the user equipment the default configuration identification, the network node may also send the user equipment one or multiple carrier frequencies. The network node may also send a cell identification, a beam identification, and/or a default configuration identification. This information may be sent via a dedicated signaling message to a specific UE, indicating that the default configuration and/or an optional parameter group may be valid in a neighboring carrier frequency, a cell, and/or a beam. In certain embodiments, the network node may provide the UE with a mapping. The mapping may indicate how each parameter corresponds to an optional group.

Figure 5:
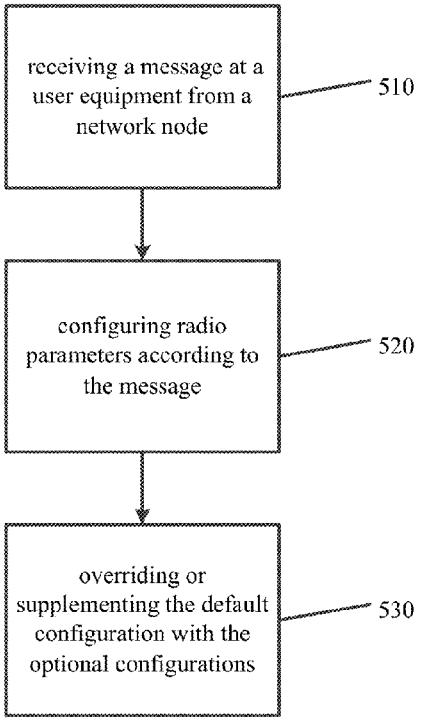
FIG. 5 illustrate a flow diagram according to certain embodiments.

FIG. 5 illustrates a flow diagram according to certain embodiments. Specifically, FIG. 5 illustrates an embodiment of the user equipment. In step 510, the user equipment may receive a message at the UE from a network node via a physical broadcast channel. The message, for example, may be a system information message. The message may include optional parameter groups that include optional configurations for parameters that override or supplement a default configuration of the parameters. The parameters, for example, may be system information parameters. The number of optional configurations may be determined such that the container size provided by the lower layers, such as a physical layer, is not exceeded.

In step 520, the network node may configure radio parameters according to the message, and override or supplement the default configuration with the optional configurations, as shown in step 530. The UE may also receive an indication from the network node whether the optional configurations should override or supplement the default configurations. Upon receiving the message, the UE may determine the default configuration identification of the target cell, and apply a valid optional parameter group.

In certain embodiments, the UE may determine whether a first optional parameter group has been indicated. If so, the UE may request or trigger a request for a second parameter group. The second parameter group may be received from the network via dedication signaling, such as system information signaling. Upon receiving the second parameter group, the UE may determine that the first optional parameter group prevents the second optional parameter group from being encoded into the information block, for example, a system information block.

In certain embodiments an optional parameter group may include a mandatory parameter set. The UE may then determine the mandatory parameter set in an optional parameter group that has been encoded into the system information. In certain embodiments, the dedicated signaling message received by the UE may be received from an intra-radio access technology (RAT) node or an inter-RAT node.

The UE may store one or multiple carrier frequencies, cell identification, beam identification, and/or default configuration identifications, as well as the optional parameter groups, in a dedicated signaling message. The message may indicate that the default configuration and/or the optional configurations may be valid in a neighboring carrier frequency, cell, and/or beam. The parameters may then be set in accordance with the default configuration and/or optional configurations when accessing the neighboring carrier frequency, cell, and/or beam.

Certain embodiments may also include an interworking scenario, such as an inter-RAT or an intra-RAT, for requesting default configuration values through macro connections. Inter-RAT, for example, may include an LTE macro overlay and a small new radio (NR) deployment. An intra-RAT, on the other hand, may include an NR macro overlap and an NR small cell deployment. A network entity may provide the UE with a small cell default configuration and/or a cell identification.

The UE may, in some embodiment, determine at a UE if at least one optional parameter group is present. If so, the UE may request a small cell via a dedicated signal to retrieve the optional parameters. In another example, the UE may determine, using a pre-configuration, whether to request a specific optional parameter group, via a macro layer or NR layer on a per parameter group basis. In certain embodiments, the UE may determine an optional parameter group identification, which overrides at least a part of the default configuration parameters. The UE may request the optional configuration group parameters via dedicated signaling. For example, the request may be directed to parameters from a different frequency layer or node, or an inter-RAT node.

FIG. 6 illustrates system information according to certain embodiments. Specifically, FIG. 6 illustrates an ASN.1 coding that describes a system information block including radio resource configuration information that may be common for all UEs. The information block may be sent via a BCCH, from the network node to the UE. In the embodiment shown in FIG. 6, the system information block includes a PLMN-identity, a cell identity, at least one default configuration identification, and two optional configuration groups. FIG. 7a illustrates an embodiment of a first optional configuration group that includes radio resource configuration information that may be common for all UEs. FIG. 7b, on the other hand, illustrates an embodiment of a second optional configuration group that includes radio resource configuration information that may also be common for all UEs.

In certain embodiments, the UE may attempt to decode or interpret the SIB, and the information contained therein. For example, the SIB may be provisioned by the network node via dedicated signaling with a default configuration identification mapped to a certain parameter set. The SIB may also include at least one optional parameter group that may include parameter configuration for a specific use case to which the cell is deployed. After receiving the default configuration identification, the UE may configure its radio protocols according to default configuration parameters. The UE may then override the default parameters indicated by the optional parameter group.

Figure 8:
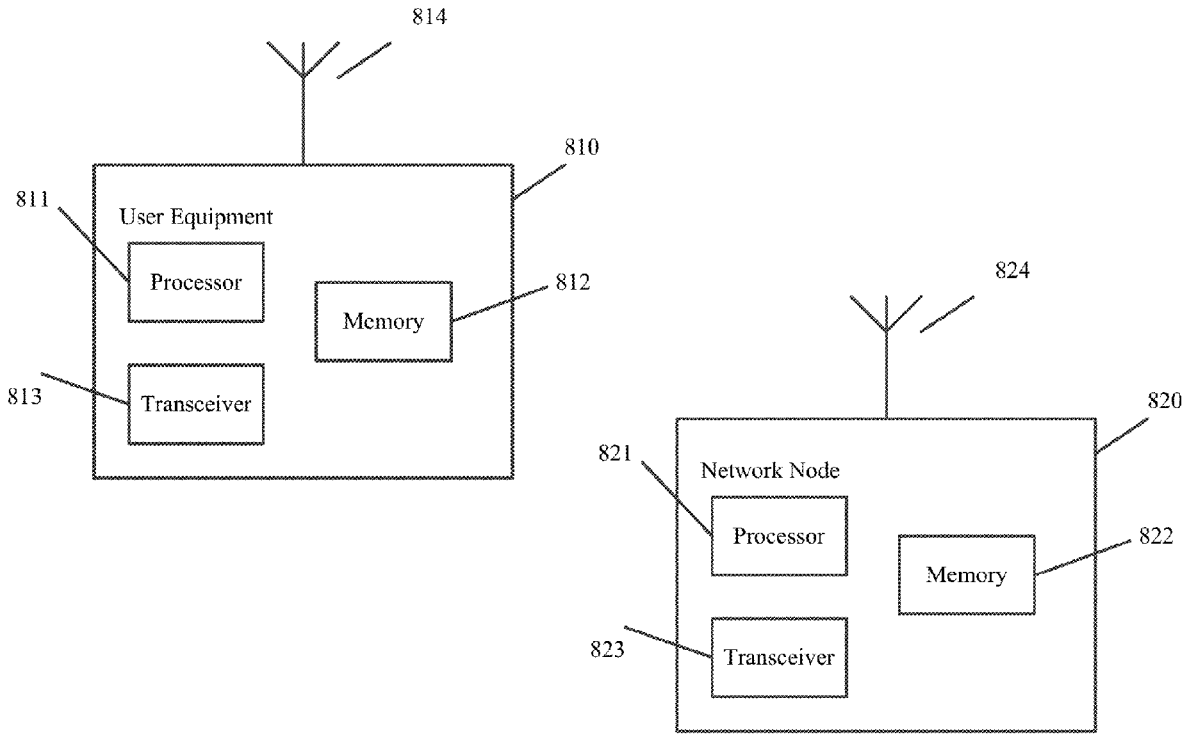
FIG. 8 illustrates a system according to certain embodiments.

FIG. 8 illustrates a system according to certain embodiments. It should be understood that each signal or block in FIGS. 1, 2, 3, 4, 5, 6, 7a, and 7b may be implemented by various means or their combinations, such as hardware, software, firmware, one or more processors and/or circuitry. In one embodiment, a system may include several devices, such as, for example, network node 820 or UE 810. The system may include more than one UE 810 and more one network node 820, although only one access node shown for the purposes of illustration. The network node may include an access node, a base station, a 5GNB, an eNB, server, host, or any of the other access or network node discussed herein.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 810 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiments, an apparatus, such as a network node or a user equipment, may include means for carrying out embodiments described above in relation to FIGS. 1, 2, 3, 4, 5, 6, 7a, and 7b. In certain embodiments, at least one memory including computer program code can be configured to, with the at least one processor, cause the apparatus at least to perform any of the processes described herein.

According to certain embodiments, an apparatus 820 may include at least one memory 822 including computer program code, and at least one processor 821. The at least one memory 822 and the computer program code are configured, with the at least one processor 821, to cause the apparatus 820 at least to determine optional configurations for parameters that override or supplement a default configuration of the parameters. The the optional configurations are grouped into optional parameter groups. The at least one memory 822 and the computer program code are also configured, with the at least one processor 821, to cause the apparatus 820 at least to encode at least one of the optional parameter groups in a message. In addition, the at least one memory 822 and the computer program code are also configured, with the at least one processor 821, to cause the apparatus 820 at least to transmit the message from the network node to a user equipment.

According to certain embodiments, an apparatus 810 may include at least one memory 812 including computer program code, and at least one processor 811. The at least one memory 812 and the computer program code are configured, with the at least one processor 811, to cause the apparatus 810 at least to receive a message at a user equipment from a network node. The message comprises optional parameter groups comprising optional configurations for parameters that override or supplement a default configuration of the parameters. The at least one memory 812 and the computer program code may also be configured, with the at least one processor 811, to also cause the apparatus 810 at least to configure radio parameters according to the message. In addition, the at least one memory 812 and the computer program code may also be configured, with the at least one processor 811, to also cause the apparatus 810 at least to override or supplement the default configuration with the optional configurations.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 820 or UE 810, to perform any of the processes described above (see, for example, FIGS. 1, 2, 3, 4, 5, 6, 7a, and 7b). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 8 illustrates a system including a network node 820 and UE 810, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The UE 810 may likewise be provided with a variety of configurations for communication other than communication network node 820. For example, the UE 810 may be configured for device-to-device communication.

Certain embodiments may allow for signal flexibility while also preventing overhead gain. The embodiments can allow for increased flexibility when using default configuration identifications, without having to make each parameter independently configurable so as to not exceed a maximum container size of a broadcast channel Each optional parameter group may contribute only one optional bit into the ASN.1 encoding, rather than the multiple bits which would be used if the parameters were to be separately signaled. This can help to reduce the overhead as compared to separately signaling all of the optional parameters. The optional parameters inside a specific optional parameter group may then indicate that a given optional parameter is mandatory when the optional parameter is present. The above embodiments may be included in as part of beamforming system that employs beam sweeping where the SIB container size may be limited in space, and in which not all parameters may be flexible.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although many of the above embodiments relate to system information parameters, the parameters are not limited to system information, and may include to any other network information and/or data.

PARTIAL GLOSSARY

BCCH Broadcast Control Channel
ID Identification
IODT Interoperability Development Testing
mMTC Massive Machine Type Communications
MNO Mobile Network Operator
NR New Radio
PBCH Physical Broadcast Channel
PLMN Public Land Mobile Network
RAT Radio Access Technology
RRC Radio Resource Control
SIB System Information Block
TRP Transmission-Reception Point
URLLC Ultra Reliable Low Latency Communications
UTRAN UMTS Terrestrial Radio Access Network

We claim:

1. A method[,] comprising:

determining *a plurality of* optional configurations for *one or more* parameters, *respective optional configurations of the plurality of optional configuration overriding or supplementing* [that override or supplement a] *at least one* default configuration of the *one or more* parameters, wherein the *plurality of* optional configurations are grouped into *a number of* optional parameter groups;

determining [a] *the* number of [the] optional parameter groups *of optional configurations from among the plurality of optional configurations that are* to be encoded so as to not exceed a container size of a physical [broadcast] channel;

encoding the *number of* optional parameter groups *of the plurality of optional configuration* in a system information block; and transmitting, *from a network node, to a user equipment,* the system information block [from a network node to a user equipment.] *having the number of optional parameter groups of optional configurations from among the plurality of optional configurations encoded therein.*

2. The method according to claim 1, wherein an optionality bit is added to at least one of the *number of* optional parameter groups in an Abstract Syntax Notation One coding.

3. The method according to claim 1, further comprising:

prioritizing *optional parameter groups from among* the *number of* optional parameter groups based on at least one of a service supported by a coverage area or a current network measurement.

4. The method according to claim 1, further comprising:

encoding an indication of whether *respective optional configurations of* the *plurality of* optional configurations override or supplement the *at least one* default configuration *of the one or more parameters.*

5. The method according to claim 1, further comprising:

adding an identification of the *at least one* default configuration to the system information block.

6. The method according to claim 1, wherein the system information block is transmitted through a broadcast or a dedicated signal.

7. The method according to claim 1, further comprising:

adding, *to at least one of a neighboring carrier frequency, a neighboring cell, or a neighboring beam,* an indication of validity of [at least one of] the *at least one* default configuration or the *number of* optional parameter groups. [to at least one of a neighboring carrier frequency, a neighboring cell, or a neighboring beam.]

8. The method according to claim 1, further comprising:

adding, *to the system information block,* a mapping between the *plurality of* optional configurations and the *one or more* parameters. [to the system information block.]

9. The method according to claim 1, further comprising:

adding an identification of *respective optional configurations of* the *plurality of* optional configurations indicating an availability of *respective optional configurations of* the *plurality of* optional configurations in a cell.

10. A method[,] comprising:

receiving, *at a user equipment, from a network node,* a system information block [at a user equipment from a network node, wherein the system information block comprises] *comprising a number of* optional parameter groups, *the number of optional parameter groups* comprising *a plurality of* optional configurations for *one or more* parameters, *wherein respective optional configurations of the plurality of optional configurations* [that] override or supplement [a] *at least one* default configuration of the *one or more* parameters, [and] wherein the *number of* optional parameter groups do not exceed a container size limit of a physical [broadcast] channel;

configuring radio parameters according to the system information block; and overriding or supplementing the *at least one* default [configuration] *configurations* with *one or more of* the *plurality of* optional configurations.

11. The method according to claim 10, further comprising:

determining if a first *portion* of the *plurality of* optional [parameter groups] *configurations* has been received; and requesting a second *portion* of the *plurality of* optional [parameter groups] *configurations* via dedicated signaling from the network node.

12. The method according to claim 10, further comprising:

determining that *one or more of* the *plurality of* optional configurations override [the] *at least one* default configuration *of the one or more parameters*.

13. The method according to claim 10, further comprising:

determining a mandatory configuration within the *plurality of* optional configurations included in the system information block.

14. The method according to claim 10, wherein the system information block is received via dedicated signaling, and wherein the network node is an intra-network or an inter-network node.

15. The method according to claim 10, further comprising:

requesting the *plurality of* default configuration via a macro connection.

16. The method according to claim 10, further comprising:

determining if at least one of the *plurality of* optional configurations is present; and

[request] *requesting, from a small cell, via a dedicated signal,* the at least one of the *plurality of* optional configurations. [via a dedicated signal from a small cell.]

17. An apparatus[,] comprising:

*at least one processor; and* at least one memory [comprising computer program code;

at least one processor;

wherein the at least one memory and the computer program code are configured, with the at least one processor, to cause the apparatus at least to:] *storing instructions that, when executed by the at least one processor, causes the apparatus to perform at least:*

[determine] *determining a plurality of* optional configurations for *one or more* parameters, *respective optional configurations of the plurality of optional configurations overriding or supplementing* [that override or supplement a] *at least one* default configuration of the *one or more* parameters, wherein the *plurality of* optional configurations are grouped into *a number of* optional parameter groups;

[determine a] *determining the* number of [the] optional parameter groups *of optional configurations from among the plurality of optional configurations* to be encoded so as to not exceed a container size of a physical [broadcast] channel;

[encode] *encoding* the *number of* optional parameter groups in a system information block; and

[transmit] *transmitting, from a network node, to a user equipment,* the system information block [from a network node to a user equipment.] *having the number of optional parameter groups of optional configurations from among the plurality of optional configurations encoded therein.*

18. An apparatus[.] comprising:

*at least one processor; and* at least one memory [comprising computer program code;

at least one processor;

wherein the at least one memory and the computer program code are configured, with the at least one processor, to cause the apparatus at least to:] *storing instructions that, when executed by the at least one processor, cause the apparatus to perform at least:*

[receive] *receiving, at a user equipment, from a network node,* a system information block [at a user equipment from a network node, wherein the system information block comprises] *comprising a number of* optional parameter groups, *the number of optional parameter groups* comprising *a plurality of* optional configurations for *one or more* parameters, *respective optional configurations of the plurality of optional configurations overriding or supplementing at least one* [that override or supplement a] default configuration of the *one or more* parameters, [and] wherein *respective optional parameter groups of* the *number of* optional parameter groups do not exceed a container size limit of a physical [broadcast] channel;

[configure] *configuring* radio parameters according to the system information block; and

[override] *overriding* or supplementing the *at least one* default configuration with *at least some of* the *plurality* optional configurations.

*19. An apparatus comprising:*

*at least one processor; and*

*at least one memory storing instructions that, when executed by the at least one processor, cause the apparatus to perform at least:*

*receiving, from a network node, a system information block comprising one or more optional parameter groups, the one or more optional parameter groups comprising one or more optional configurations for one or more parameters, wherein the one or more parameters have one or more default configurations, and wherein the one or more optional parameter groups are limited so as not to exceed a container size provided by a physical laver; and*

*applying at least some of the one or more optional configurations for the one or more parameters to override the one or more default configurations of the one or more parameters.*

*20. The apparatus according to claim 19, wherein one or more mandatory configurations are included within the one or more optional configurations in the system information block.*

*21. The apparatus according to claim 19, wherein the system information block is received via dedicated signaling.*

*22. The apparatus according to claim 19, wherein the instructions, when executed by the at least one processor, further cause the apparatus to perform:*

*determining that at least one of the one or more optional configurations is present in one of the one or more optional parameter groups; and*

*requesting the at least one of the one or more optional configurations via a dedicated signal from a small cell.*

*23. A method comprising:*

*receiving, at a user equipment, from a network node, a system information block comprising one or more optional parameter groups, the one or more optional parameter groups comprising one or more optional configurations for one or more parameters, wherein the one or more parameters have one or more default configurations, and wherein the one or more optional parameter groups are limited so as not to exceed a container size provided by a physical layer;*

*applying at least some of the one or more optional configurations for the one or more parameters to override the one or more default configurations of the one or more parameters.*

*24. The method according to claim 23, wherein one or more mandatory configurations are included within the one or more optional configurations in the system information block.*

*25. The method according to claim 23, wherein the system information block is received via dedicated signaling.*

*26. The method according to claim 23, further comprising:*

*determining that at least one of the one or more optional configurations is present in one of the one or more optional parameter groups; and*

*requesting the at least one of the one or more optional configurations via a dedicated signal from a small cell.*

*27. An apparatus comprising:*

*at least one processor; and*

*at least one memory storing instructions that, when executed by the at least one processor, cause the apparatus to perform at least:*

*determining based at least on a system information block associated with a network, one or more optional parameter groups comprising one or more optional configurations for one or more parameters, wherein the one or more parameters have one or more default configurations, and wherein the one or more optional parameter groups are limited so as not to exceed a container size provided by a physical layer; and*

*applying the one or more optional configurations for the one or more parameters to supplement the one or more default configurations of the one or more parameters.*

*28. The apparatus according to claim 27, wherein one or more mandatory configurations are included within the one or more optional configurations in the system information block.*

*29. The apparatus according to claim 27, wherein the system information block is received via dedicated signaling.*

*30. The apparatus according to claim 27, wherein the instructions, when executed by the at least one processor, further cause the apparatus to perform:*

*determining that at least one of the one or more optional configurations is present in one of the one or more optional parameter groups; and*

*requesting the at least one of the one or more optional configurations via a dedicated signal from a small cell.*

*31. The apparatus according to claim 27, wherein the instructions, when executed by the at least one processor, further cause the apparatus to perform:*

*determining that a first optional parameter group of the one or more optional parameter groups has been received; and*

*requesting a second optional parameter group of the one or more optional parameter groups via dedicated signaling from the network node.*

*32. The apparatus according to claim 27, wherein the instructions, when executed by the at least one processor, further cause the apparatus to perform:*

*determining one or more mandatory configurations within the one or more optional configurations included in the system information block.*

*33. The apparatus according to claim 27, wherein the system information block is received via dedicated signaling and wherein the network node is an intra-network or an inter-network node.*

*34. The apparatus according to claim 27, wherein the instructions, when executed by the at least one processor, further cause the apparatus to perform:*

*requesting the one or more default configurations via a macro connection.*

*35. An apparatus comprising:*

*at least one processor; and*

*at least one memory storing instructions that, when executed by the at least one processor, cause the apparatus to perform at least:*

*determining based at least upon a system information block provided by a network node, whether the system information block comprises one or more optional parameter groups, the one or more optional parameter groups comprising one or more optional configurations for one or more parameters, the one or more optional parameter groups being limited so as not to exceed a container size provided by a physical layer; and*

*in an instance in which the system information block comprises the one or more optional configurations for the one or more parameters, causing the one or more optional configurations to supersede one or more default configurations for the one or more parameters.*

*36. The apparatus according to claim 35, wherein one or more mandatory configurations are included within the one or more optional configurations in the system information block.*

*37. The apparatus according to claim 35, wherein the instructions, when executed by the at least one processor, further cause the apparatus to perform:*

*receiving the system information block via dedicated signaling.*

*38. The apparatus according to claim 35, wherein the instructions, when executed by the at least one processor, further cause the apparatus to perform:*

*determining that the one or more optional configurations is present; and*

*requesting the one or more optional configurations via a dedicated signal from a small cell.*

*39. The apparatus according to claim 35, wherein the instructions, when executed by the at least one processor, further cause the apparatus to perform:*

*determining based at least on the one or more optional parameter groups received from the network node, whether to request at least one additional optional parameter group; and*

*in an instance in which the at least one additional optional parameter group should be requested, requesting the at least one additional optional parameter group via dedicated signaling from the network node.*

*40. The apparatus according to claim 35, wherein the instructions, when executed by the at least one processor, further cause the apparatus to perform:*

*determining that the one or more optional configurations mandatorily supersede the one or more default configurations.*

*41. The apparatus according to claim 35, wherein the instructions, when executed by the at least one processor, further cause the apparatus to perform:*

*determining one or more mandatory configurations within the one or more optional configurations included in the system information block.*

*42. The apparatus according to claim 35, wherein the system information block is received via dedicated signaling from the network node, and wherein the network node is an intra-network node or an inter-network node.*

*43. The apparatus according to claim 35, wherein the instructions, when executed by the at least one processor, further cause the apparatus to perform:*

*requesting the one or more default configurations via a macro connection.*

*44. An apparatus comprising:*

*at least one processor; and*

*at least one memory storing instructions that, when executed by the at least one processor, cause the apparatus to perform at least:*

*receiving at least one beam from a network node, the at least one beam providing a system information block comprising common and shared channel information for a cell area of the network;*

*determining whether the system information block comprises one or more optional parameter groups, the one or more optional parameter groups comprising one or more optional configurations for one or more parameters, the one or more optional parameter groups being limited so as not to exceed a container size provided by a physical laver; and*

*in an instance in which the system information block comprises the one or more optional configurations for the one or more parameters, causing at least some of the one or more optional configurations to supersede one or more default configurations for the one or more parameters.*

* * * * *